(12) United States Patent
Zanella et al.

(10) Patent No.: US 8,502,433 B2
(45) Date of Patent: Aug. 6, 2013

(54) GRIP MEMBER WITH HAPTIC FEED-BACK

(75) Inventors: Alessandro Zanella, Orbassano (IT);
Tommaso Luchetti, Orbassano (IT);
Stefano Alacqua, Orbassano (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 1125 days.

(21) Appl. No.: 12/437,983

(22) Filed: May 8, 2009

(65) Prior Publication Data

US 2009/0288272 A1    Nov. 26, 2009

(30) Foreign Application Priority Data

May 21, 2008  (EP) .................................... 08425362

(51) Int. Cl.
*H02N 2/00* (2006.01)
*G10K 9/122* (2006.01)
*G10K 9/12* (2006.01)

(52) U.S. Cl.
CPC ................ *H02N 2/001* (2013.01); *G10K 9/121* (2013.01)
USPC ........................................................ 310/328

(58) Field of Classification Search
CPC ...... H01L 41/09; H01L 41/0986; H02N 2/001; H02N 2/002; H02N 2/0055; H02N 2/02; G10K 9/121; G10K 9/122; G10K 9/125
USPC .......................................................... 310/328
See application file for complete search history.

(56) References Cited

U.S. PATENT DOCUMENTS

| 7,112,107 | B1 | 9/2006 | Torgerud | |
| 2005/0268744 | A1 | 12/2005 | Embach et al. | |
| 2007/0080608 | A1* | 4/2007 | Maruyama et al. | 310/317 |
| 2007/0236450 | A1* | 10/2007 | Colgate et al. | 345/156 |

FOREIGN PATENT DOCUMENTS

| EP | 1 359 486 | 11/2003 |
| FR | 2 740 276 | 4/1997 |
| JP | 2002-224848 | 8/2002 |
| JP | 2007-022340 | 2/2007 |

OTHER PUBLICATIONS

European Search Report EP 08425362.4 dated Oct. 14, 2008.

* cited by examiner

*Primary Examiner* — Derek Rosenau
(74) *Attorney, Agent, or Firm* — Nixon & Vanderhye P.C.

(57) ABSTRACT

A grip member is equipped with a plurality of modules for generating haptic feed-back distributed along the grip member and activatable according to a pre-set sequence.

19 Claims, 6 Drawing Sheets

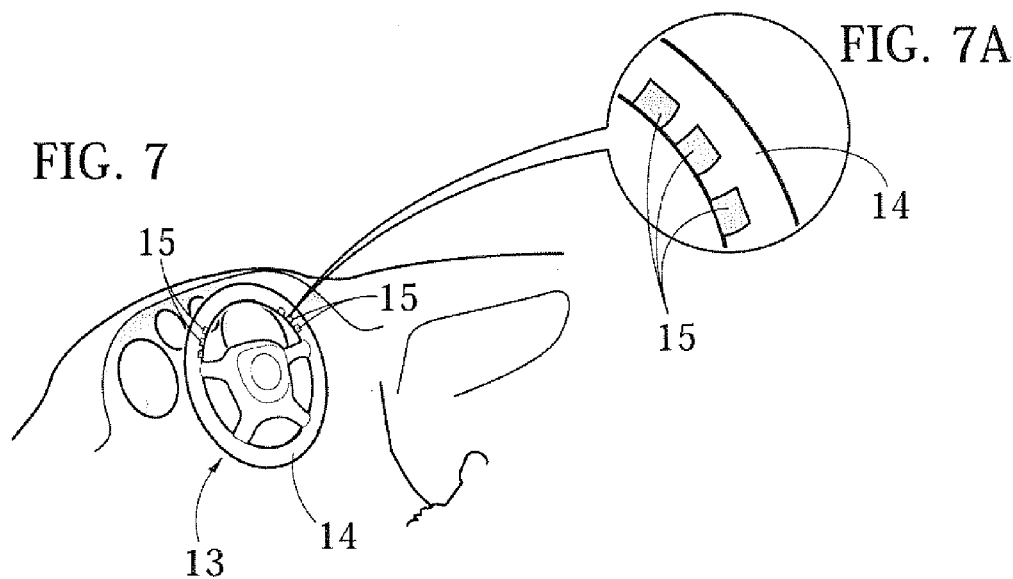
FIG. 7
FIG. 7A
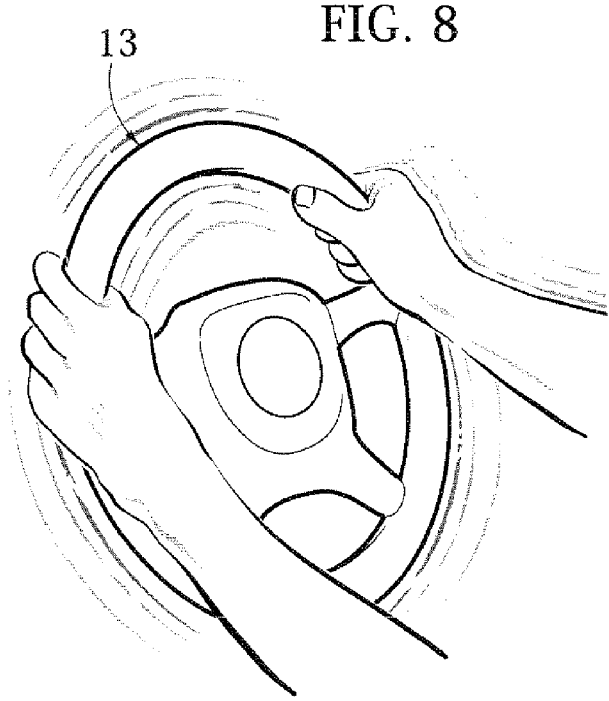
FIG. 8
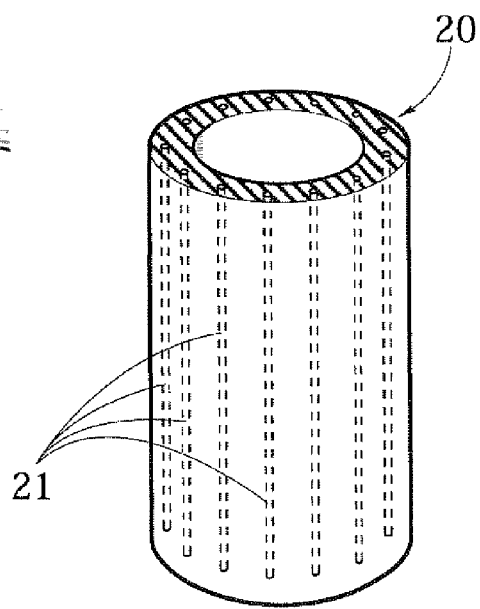
FIG. 9

GRIP MEMBER WITH HAPTIC FEED-BACK

This application claims priority to European Application No. 08425362.4, filed 21 May 2008, the entire contents of which is hereby incorporated by reference.

The present invention relates to a grip member comprising means for generating a haptic feed-back. A grip member of this type is for example described in the document No. U.S. Pat. No. 7,112,107.

In the present description and in the ensuing claims, by the expression "haptic feed-back" is meant any type of feed-back signal that can be detected by the user through the sense of touch and that typically consists in a vibration that can be detected by touch, but also in any other phenomenon that can be detected by touch, such as a variation of temperature or else a variation of shape or volume of the grip member.

Grip members with haptic feed-back have already been proposed, for example, for applications on members for manual control of devices of various nature in order to provide the user with immediately perceptible information concerning the occurrence of a given condition of operation.

The object of the present invention is to provide a grip member of the type specified above that will be constructively simple and reliable in operation and that will enable a more advanced transmission of information to be obtained as compared to the simple information on the achievement of a given condition of operation.

With a view to achieving said purpose, the subject of the invention is a grip member with haptic feed-back of the type referred to above, the main characteristic of which lies in the fact that the means for generating the haptic feed-back comprise a plurality of haptic feed-back generator modules distributed along the grip member and means for controlling activation according to a pre-set sequence of said modules in such a way as to generate a pre-set haptic signal on the grip member.

Preferably, the haptic signal is of a type that travels along the grip member in order to transmit a sensation of direction. Thanks to said characteristic, the grip member according to the invention is able to transmit to the user not only information concerning the occurrence of a given operating condition, but also information concerning the need to displace the grip member in a given direction, in order to enable proper operation of the device associated thereto. For this purpose, the haptic signal generated travels along the grip member in a direction corresponding to the one in which the grip member must be displaced, so as to furnish the user with a signal that is immediately and intuitively perceived as an instruction of displacement in the required direction.

Further preferred and advantageous characteristics of the invention are specified in the annexed dependent claims, the content of which forms an integral part of the teaching regarding the present invention.

A possible application of the grip member according to the invention regards manually controlled workshop tools, such as for example an electric spot-welding gun of the type in which the weight of the tool is supported by a hoist or similar equipment and the user must simply displace the welding gun in the working position, for example to make electrical spot welds on the body of a motor vehicle during on-line production thereof. In applications of this type, the welding gun must be set within a pre-set area adjacent to the piece to be welded, and the grip member according to the invention can be used both to indicate to the user when the tool is out of the correct position and also to provide an intuitive signal, for example concerning the need to raise or lower the tool to position it correctly.

Another possible application of the invention can be conceived for a driving wheel of a motor vehicle. In this case, the haptic feed-back generator modules can be constituted by piezoelectric films applied on the rim of the driving wheel along its circumferential extension. The generator modules can be controlled so as to generate a haptic signal travelling along the rim of the driving wheel, for example to suggest a manoeuvre of correction of the position of steering and moreover transmit to the user an alarm signal corresponding to the occurrence of a given condition of danger.

BRIEF DESCRIPTION OF THE DRAWINGS

The characteristics and the advantages of the invention will emerge more clearly from the ensuing description, with reference to the annexed drawings, which are provided purely by way of non-limiting example and in which:

FIGS. 7 and 7a are a perspective view of a driving wheel of motor vehicle made in conformance with the present invention and of a detail of said driving wheel;

FIG. 8 is a further perspective view of the driving wheel according to the invention; and FIG. 9 is a perspective view of a further embodiment of the present invention.

DETAILED DESCRIPTION OF THE INVENTION

Figure 1:
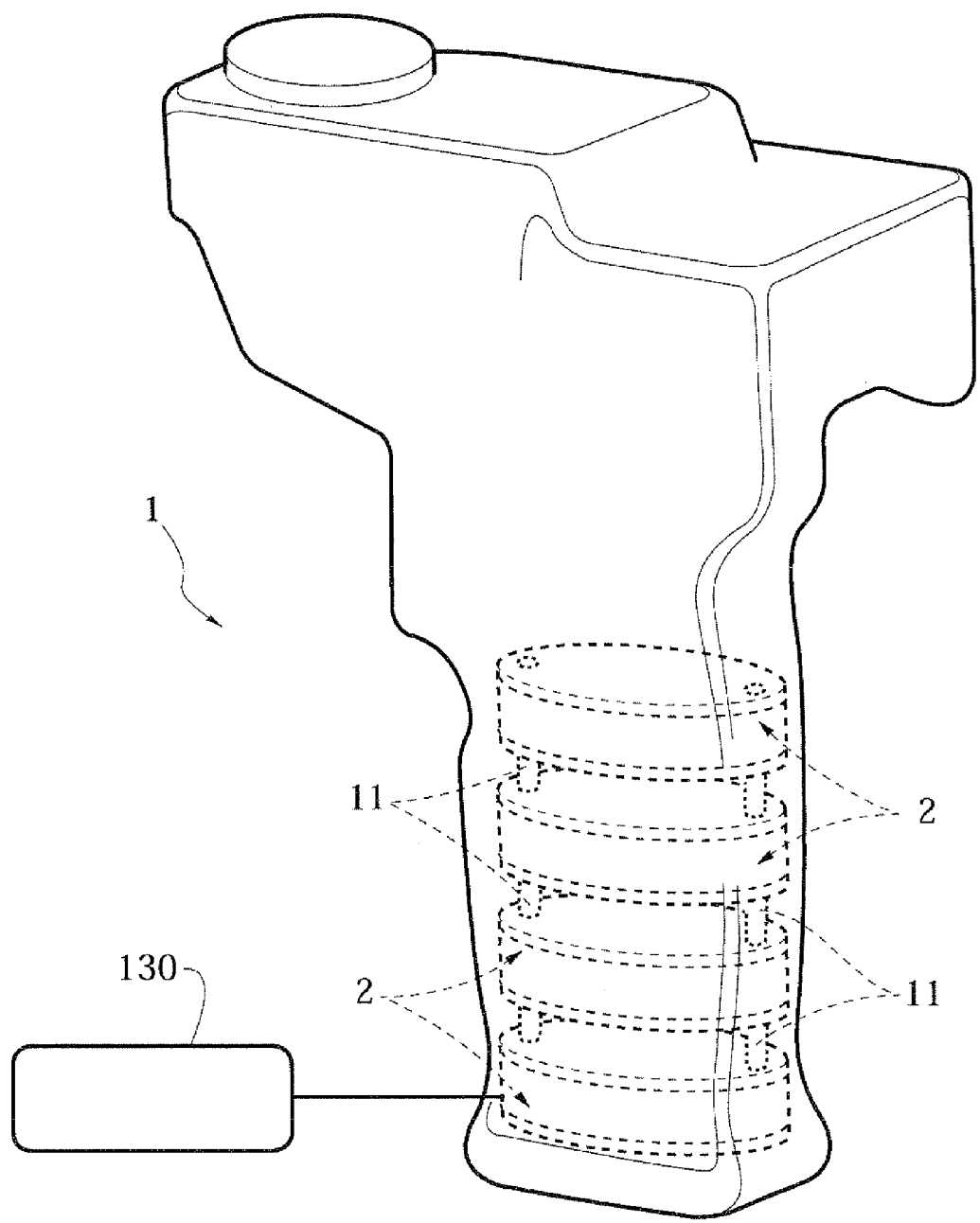
FIG. 1 is a schematic perspective view of the grip member of an electric spot-welding gun, built in conformance with the teachings of the present invention.
Figure 2:
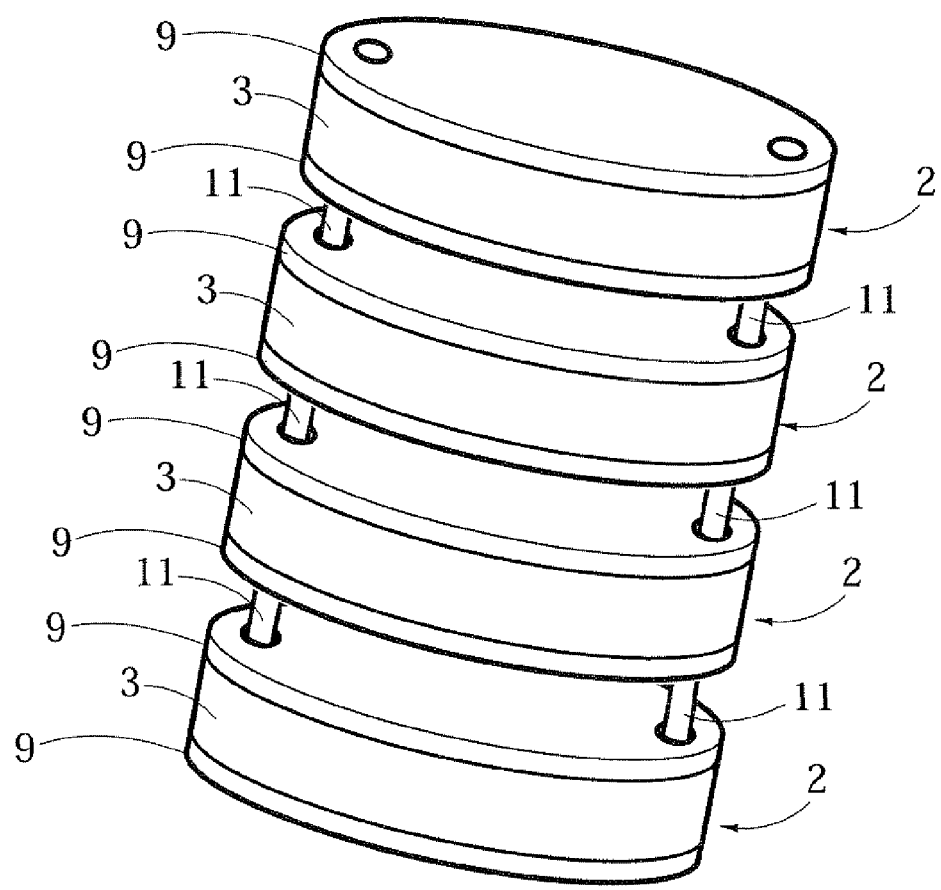
FIG. 2 is a perspective view at an enlarged scale of the structure constituting the grip member.
Figure 3:
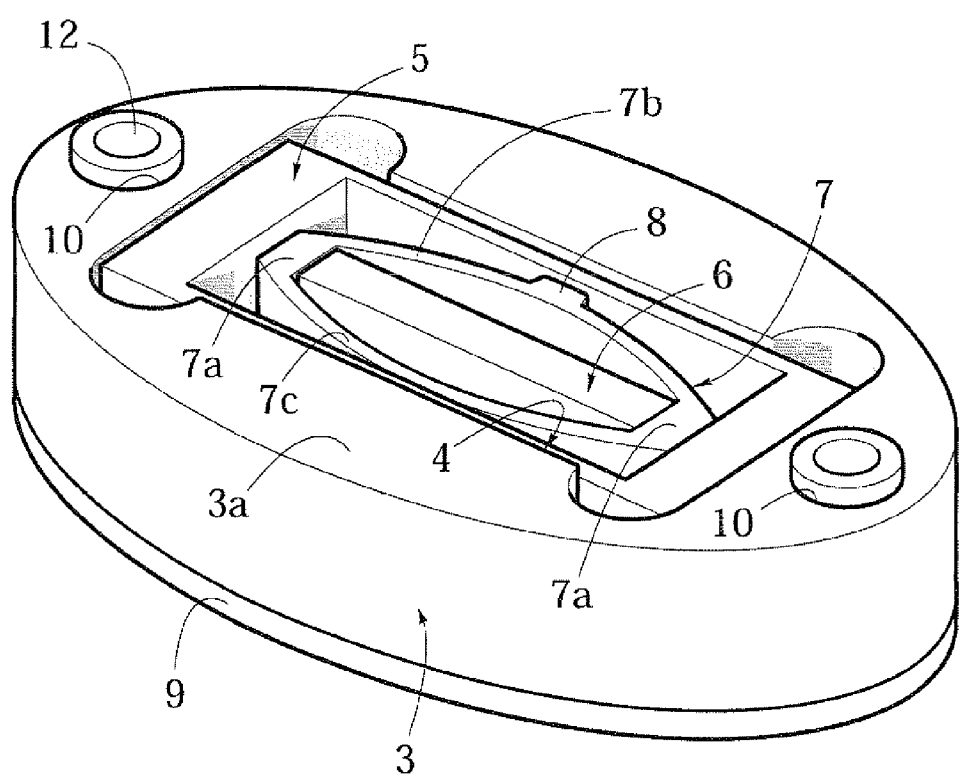
FIG. 3 is a perspective view at an enlarged scale and in a partially dismantled condition of one of the modules forming part of the structure of FIGS. 1 and 2.
Figure 4:
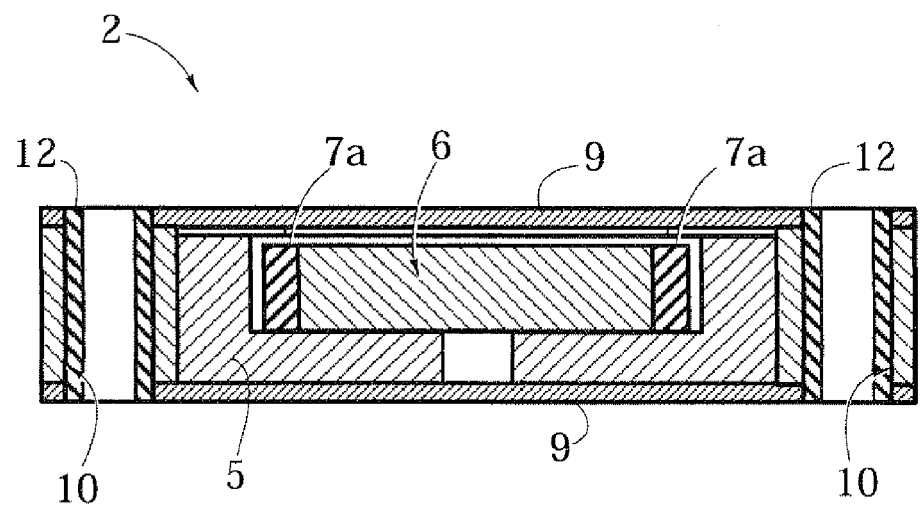
FIGS. 4, 5 are a cross-sectional view and a plan view without top coverage of the module.

In FIG. 1 the reference number 1 designates as a whole a grip member of an electric spot-welding gun, the main portion of which is constituted by a plurality of haptic feed-back generator modules 2 made in conformance with the present invention, enclosed within a cover made of soft and flexible material.

With reference to FIGS. 3-6, each of said modules comprises a substantially cylindrical body 3, with ovoid cross section, made for example of plastic material, with two opposite plane faces 3a traversed by a rectangular opening 4 that receives a metal support 5 shaped like a frame, set within which is a piezoelectric bar 6 aligned with the major axis of the ovoid cross section of the body 3. The piezoelectric bar 6 is housed within a body 7 shaped like an ovoid annular band, with major axis coinciding with the longitudinal direction of the bar 6. The body 7 is constituted by an element, for example made of metal, which has two ends 7a joined by two arched portions 7b, 7c, arched towards the outside. The portion 7c is secured in its central portion to the support 5. The portion 7b has at its centre a striking member 8 designed to co-operate with the inner surface of one of the larger sides of the frame 5.

The drawings do not illustrate the means for electric supply of the piezoelectric bar 6 and the electronic means of control of said supply provided for supplying to said bar a pulsed electric signal, with pre-set frequency, so as to generate cyclically an alternating displacement of the bar 6 between a shortened condition of rest (illustrated in FIG. 5) and an elongated condition. When the bar 6 passes from its shorter condition, illustrated in FIG. 5, to its activated longer condition, it sets the two arched branches 7b, 7c in tension, causing a recession of the striking member 8 with respect to the side of the frame 5 facing it. When the bar 6 returns into its shorter condition, the branch 7b returns elastically into the condition illustrated so that the striking member 8 transmits an impact to the frame 5 and consequently to the body 3 of plastic material. A continuous succession of electric pulses supplied to the bar 6 consequently determines a succession of impacts of the member 8 against the frame 5, which determines a haptic signal consisting in a vibratory movement of the body 3.

Figure 5:
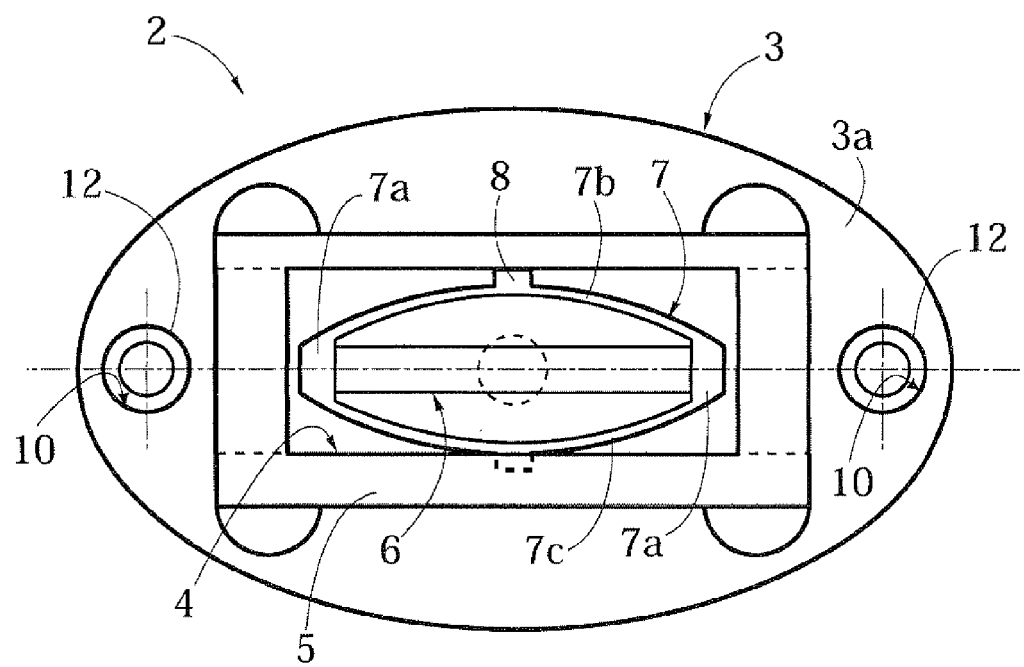
Figure 6:
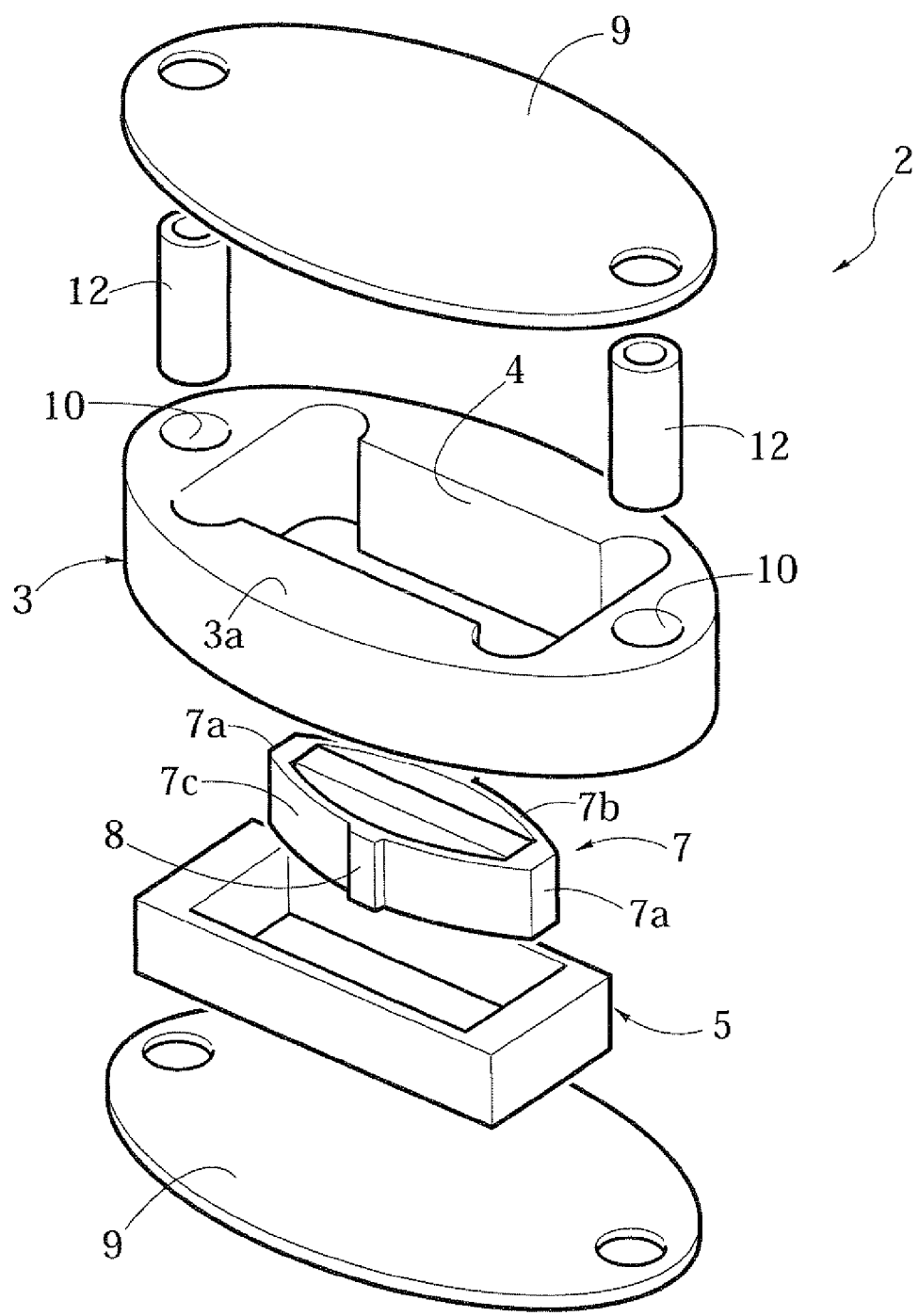
FIG. 6 is an exploded perspective view of the module.

The arrangement of a piezoelectric bar 6 with associated thereto an element for amplifying the displacement of the same type as the element 7 illustrated in FIG. 5 is in itself known, for example, from the document No. FR-A-2 740 276.

In order to isolate the vibrations of the body 3 of each module 2 with respect to the adjacent modules, both of the faces of the body 3 are covered with a plate 9 made, for example, of rubber, having damping characteristics. For the same reason, the body 3 has through holes 10 for the engagement of two supporting rods 11. However, the rods 11 engages within the holes 10, with the interposition of rubber bushings 12.

Designated as a whole by 130 in FIG. 1 is an electronic control unit for controlling electric supply to the haptic feed-back generator modules 2 distributed along the grip member. According to the invention the electronic control unit 130 is prearranged for activating the generator modules 2 according to a pre-set sequence so as to obtain on the grip member 1 a haptic signal travelling along the grip member, for example in order to transmit to the user intuitive information concerning the need, for example, to raise or lower the grip member in order to bring the tool associated thereto into a correct position. As already referred to above, a grip member of this type can be used, for example, in association with an electric spot-welding gun of the type in which the weight of the gun is supported by hoisting equipment or the like and the user has merely the job of gripping the grip member and displacing the guns into the position necessary for executing electric spot welding, for example on a body of a motor vehicle on the production line. Of course, the electronic control unit can be programmed for activating then simultaneously all the modules of the grip member when it is necessary to signal to the user the occurrence of an incorrect operating condition or a condition of danger.

FIGS. 7 and 8 illustrate the application of the invention to a driving wheel of a motor vehicle. In this case, a driving wheel 13 including a rim 14 is equipped with a plurality of haptic feed-back generator modules 15 distributed, for example, along portions of the rim of the driving wheel and activatable in sequence for transmitting to the user intuitive information concerning the need to turn the driving wheel in a given direction or activatable also simultaneously (FIG. 8) for transmitting intuitive information concerning the occurrence of an incorrect operating condition or a condition of danger.

According to the invention, the haptic-feed-back-generating means can also be constituted by actuator means different from a piezoelectric actuator, for example by shape-memory actuator means constituted by wires made of shape-memory alloys embedded in the body of the grip member. In this case, the same wires can be used both for transmitting a signal of a vibratory type and for transmitting a signal consisting in a change of shape and/or volume as well as for transmitting a sensation of heat. All the aforesaid effects can be obtained by controlling in a pre-set way a supply of electric current through the shape-memory wires.

FIG. 9 of the annexed drawings is a schematic illustration of an example of solution of this type, comprising a tubular matrix 20 made of synthetic material, in which a number of shape-memory wires 21 are embedded. As has been said, the wires can be provided for being supplied according to a first modality, in which they determine simply a change of shape and/or volume of the body 20, or else according to a second modality, in which they determine a variation of temperature of the body 20, or according to a third modality, in which they are supplied in a pulsed way to give rise to a vibratory effect.

Of course, without prejudice to the principle of the invention, the details of construction and the embodiments may vary widely with respect to what is described and illustrated herein purely by way of example, without thereby departing from the scope of the present invention.

What is claimed is:

1. A grip member comprising means for generating a haptic feed-back, wherein said means comprise a plurality of haptic feed-back generator modules distributed along said grip member, and means for controlling activation of said modules according to a pre-set sequence in such a way as to generated a pre-set haptic signal on said grip member,
   wherein the pre-set haptic signal is of a type travelling along the grip member, in such a way as to transmit a sensation of direction,
   wherein each module has a body of a substantially cylindrical shape with two opposite faces set on which is a piezoelectric element constrained in at least one point to the body so that the mechanical vibration of the piezoelectric element is transmitted to the module itself, and
   wherein the piezoelectric element is equipped with a striking member co-operating with the body so that a pulsed electrical supply of the piezoelectric element causes an alternating percussion of the striking member against the body of the module such as to impart a vibratory effect upon said body.

2. The grip member according to claim 1, wherein each of said modules comprises a piezoelectric element designed to generate a haptic signal of a vibratory type.

3. The grip member according to claim 1, wherein the body is equipped with a seat inserted within which is the aforesaid piezoelectric element.

4. The grip member according to claim 1, wherein the piezoelectric element is equipped, on the side not constrained to the body, with a counterweight, for amplifying the sensation of vibration on the body and for controlling resonance frequencies.

5. The grip member according to claim 1, wherein the piezoelectric element is constrained by both of the ends to the body and induces directly thereon a sensible vibration causing deformation thereof.

6. The grip member according to claim 1, wherein associated to the piezoelectric element is a mechanical member for amplification of the amplitude of vibration transmitted to the body.

7. The grip member according to claim 2, wherein said body is provided with elements for damping the vibrations that isolate the vibrations generated thereon with respect to the adjacent modules and with respect to the corresponding supporting structure.

8. The grip member according to claim 1, wherein the grip member is a handgrip of an electric spot-welding gun.

9. The grip member according to claim 1, wherein the grip member forms at least part of the rim of a steering wheel.

10. A grip member comprising means for generating a haptic feed-back, wherein said means comprise a plurality of hapic feed-back generator modules distributed along said grip member, and means for controlling activation of said modules according to a pre-set sequence in such a way as to generate a pre-set haptic signal on said grip member, wherein each of said modules comprises a piezoelectric element designed to generate a haptic signal of vibratory type, wherin said body is provided with elements for damping the vibrations that isolate the vibrations generated thereon with respect to the adjacent modules and with respect to the corresponding supporting structure, and wherein said damping elements comprise two plates made of material for damping the vibrations, which coat the opposite faces of the body and two tubes made of damping material arranged within two through holes made in the body and traversed by two supporting rods of the set of modules.

11. The grip member according to Claim 10, wherein the pre-set haptic signal is of a type travelling along the grip member, in such a way as to transmit a sensation of direction.

12. The grip member according to claim 11, wherein each module has a body of a substantially cylindrical shape with two opposite faces, set on which is a piezoelectric element constrained in at least one point to the body so that the mechanical vibration of the piezoelectric element is transmitted to the module itself.

13. The grip member according to claim 10, wherein said modules are set on top of one another with their faces set on parallel planes.

14. The grip member according to claim 12, wherein the body is equipped with a seat inserted within which is the aforesaid piezoelectric element.

15. The grip member according to claim 12, wherein the piezoelectric element is equipped, on the side not constrained to the body, with a counterweight, for amplifying the sensation of vibration on the body and for controlling resonance frequencies.

16. The grip member according to claim 12, wherein the piezoelectric element is constrained by both of the ends to the body and induces directly thereon a sensible vibration causing deformation thereof.

17. The grip member according to claim 12, wherein associated to the piezoelectric element is a mechanical member for amplification of the amplitude of vibration transmitted to the body.

18. The grip member according to claim 10, wherein the grip member is a handgrip of an electric spot-welding gun.

19. The grip member according to claim 10, wherein the grip member forms at least part of the rim of a steering wheel.

* * * * *